United States Patent

Billingsley

[15] 3,690,233
[45] Sept. 12, 1972

[54] PHOTOGRAPHING MEANS
[72] Inventor: James D. Billingsley, Arlington, Tex.
[73] Assignee: LTV Aerospace Corporation, Dallas, Tex.
[22] Filed: July 29, 1970
[21] Appl. No.: 59,223

[52] U.S. Cl. .................................................... 95/11
[51] Int. Cl. ............................................. G03b 19/00
[58] Field of Search ............................. 95/11; 250/65

[56] References Cited

UNITED STATES PATENTS 3,060,434  10/1962  Biedermann.............. 95/1.1 X

FOREIGN PATENTS OR APPLICATIONS 810,526  3/1959  Great Britain................ 355/71

Primary Examiner—John M. Horan
Attorney—Donald W. Phillion and H. C. Goldwire

[57] ABSTRACT

A detecting means is responsive to a passing car to produce an indicating signal. A camera and a flash lighting unit positioned down the road from the detecting means are activated simultaneously to illuminate and photograph the oncoming car. The illumination lies primarily in a spectrum including the visible deep red, the near infra-red and the intermediate infra-red. Only the visible deep red and the near infra-red radiations are able to penetrate the infra-red filtering windshield and then reflect back to the camera through an optical filter which passes only said visible deep red, near the infra-red and the small amount of intermediate infra-red radiations that pass back through the windshield. Thus the glare from ambient light is eliminated. A film sensitized to the visible deep red and to the near infra-red radiations is employed in the camera. The aforementioned system provides an identifiable photograph of the driver's facial features either during the day or at night and without causing impairment of his vision.

15 Claims, 5 Drawing Figures

JAMES D. BILLINGSLEY
INVENTOR

PHOTOGRAPHING MEANS

This invention relates generally to apparatus for, and the method of identifiably, photographing objects behind sheets of transparent material, such as glass, having the characteristic of filtering out major portions of the infra-red spectrum, and more particularly the invention relates to an apparatus and a method for identifiably photographing a driver through the windshield of his car.

Devices which measure and record the speeds of automobiles must meet certain standards of reliability and sufficiency of data in order to sustain a conviction for speeding. One means for obtaining sufficiency of evidence is to photograph the speeding automobile, including the license plate. If a police officer is present at the time the violation occurs, the speeding car can be stopped and a summons issued at that time.

In some cases, however, the photograph of the car, including the license plate, is recorded by a device which is unattended by an officer. Later the film is removed from the camera and developed, and summonses are subsequently issued on the basis of the evidence depicted in such photographs. HOwever, in many states, the courts will not uphold convictions based upon such photographic evidence if the facial features of the driver are not identifiable in the photograph. While it is apparent that the registered owner of the car can be determined easily from the license plate, it is also apparent that the owner might not necessarily have been driving the car when the speeding violation occurred. Consequently, corroborative evidence usually is required in support of the photographic evidence where the facial features are not identifiable.

Efforts have been made to obtain good photographs of the driver through the use of flash lighting means or units in conjunction with cameras. While such flash units can be utilized during daylight hours with some efficiency, their use at night is not feasible since they produce a temporary impairment or blinding of the driver, which impairment lasts for several seconds after the flash.

While lighting of wavelength much longer than that of the near infra-red does not blind the driver, it cannot be employed because of the transmission characteristics of most windshields. More specifically, modern windshield glass is a highly effective filter for most infra-red radiation. Thus, while intermediate and far infra-red radiation is not perceivable by the driver and has no harmful effects on the driver's eyes, its use is not practical due to the filtering effect of the windshield.

A primary object of the invention is to provide an arrangement whereby the driver of an automobile can be photographed through his windshield with sufficient clarity so that his facial features are identifiable.

Another object of the invention is to provide a means for photographing a driver through his automobile windshield with sufficient clarity so that his facial features are identifiable and without even temporary harm to the driver's vision.

A further object of the invention is to obtain a good photograph of a driver through his automobile windshield either during the daytime or at night.

Yet another object of the invention is the elimination of glare, from the viewpoint of a camera, caused by ambient light that is present when taking photographs through car windshields.

A still further object of the invention is to produce good photographs of a driver through his automobile windshield, either in the daytime or at night, without impairing the driver's vision.

A seventh purpose of the invention is a method of obtaining good photographs of a driver through his automobile windshield, either during the day or at night, and without any appreciable glare from the windshield due to ambient lighting.

Still another object of the invention is the improvement of photographing techniques generally.

In accordance with the invention, which encompasses both a method and the apparatus for performing said method, there is provided a detecting means positioned in a roadway and constructed to respond to the passage of an automobile to produce an output signal indicative of the presence of said automobile which is oncoming in relation to the camera and flash unit. Ahead of said automobile and alongside the road, there is provided a flash lightning means or unit having a filtering means thereon which filters out most of the visible range of radiation so that, when energized, the flash unit emits a spectrum of radiation which includes the deep red of the visible range and the near infra-red range. No harm is done if the flash unit also emits much of the remainder of the infra-red spectrum. Focusing means are provided to beam the radiation toward the front of the oncoming car and to illuminate the driver's face therewith through the window. Since modern windshields filter out most of the infra-red radiation, only the visible deep red and the near infra-red energy passes through the windshield to flood the driver's face and is reflected therefrom back through the windshield to a suitable camera. Such a camera is provided with a filtering means constructed to pass only the deep red radiation of the visible range and the near infra-red portion of the spectrum, though no harm is done if the filter also passes other portions of the infra-red range of radiation. On the reflected, filtered radiation there is modulated an image of the driver and the front of the vehicle. The camera is loaded with a film sensitive to visible deep red and near infra-red radiations and is positioned near the illuminating flash unit. A suitable camera activating means 14 functions to receive the output signal from the detecting means 13 and respond to the same to activate the camera shutter and (through a flash unit energizing means 16) the flash unit, thereby taking a picture that shows the facial features of the driver and an image of the oncoming car that includes the car's license plate and the number and/or letters thereon.

In accordance with a feature of the invention, an ordinary inexpensive lens is provided to focus the radiation from said flash unit into a beam which is directed onto the front of the oncoming car, including the windshield thereof.

In accordance with another feature of the invention the line-of-sight from the camera to the automobile is at a minimum angle of approximately 18° with respect to the line-of-sight of the flash unit to the automobile, thereby minimizing reflection of the radiation from the retinas of the driver's eyes back to the camera.

In accordance with yet another feature of the invention, a polarizing filter is positioned between the camera and the car to reduce the glare of ambient light.

The above-mentioned and other objects and features of the invention will be more fully understood from the following detailed description thereof when read in conjunction with the drawings in which.

Figure 1:
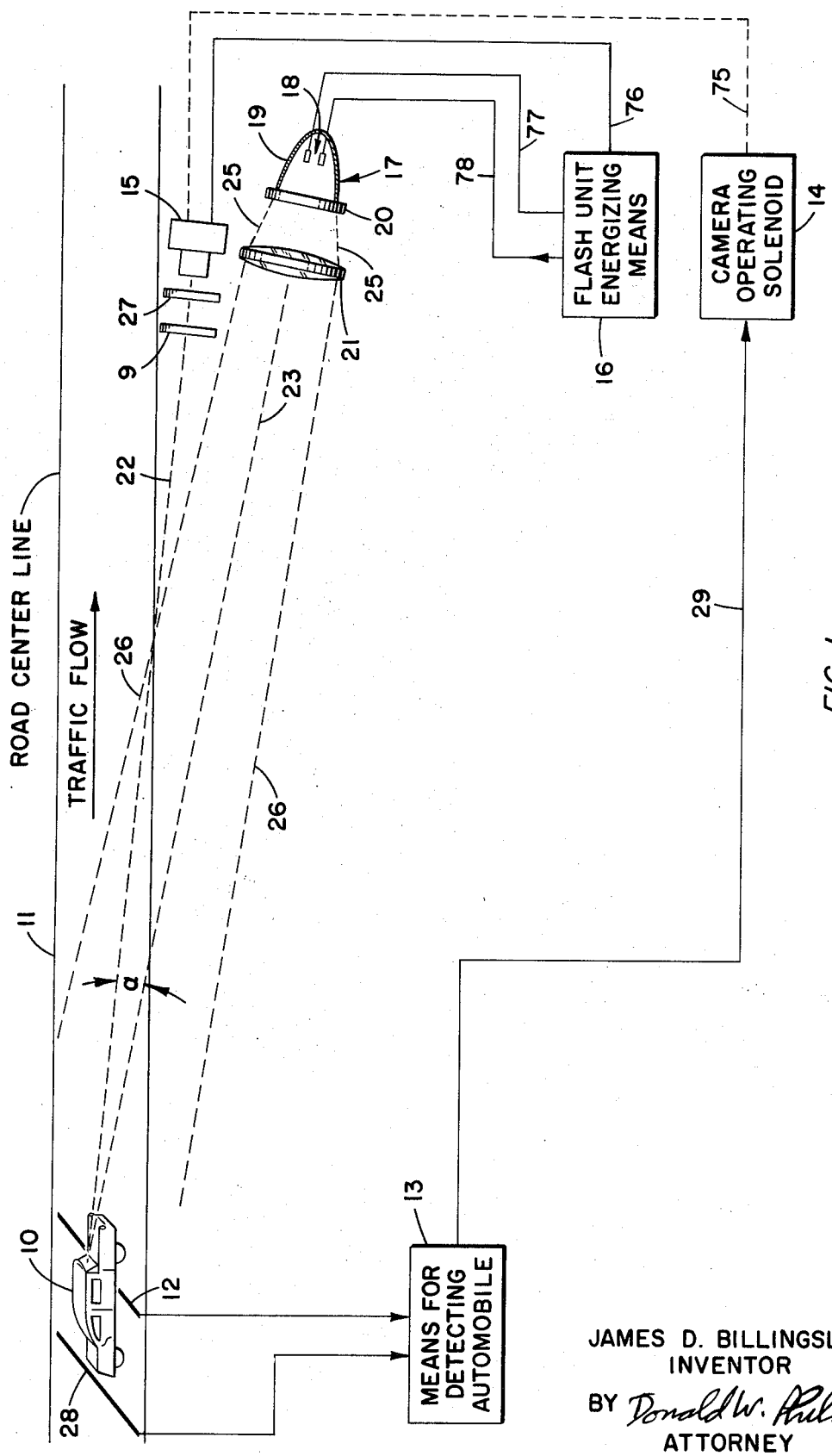
FIG. 1 is a pictorial representation of the system, showing the relative positions of the oncoming automobile, the camera and the flash unit, and the automobile detecting means.

Referring now to FIG. 1, the camera 15 and the light source 17 are both positioned along the side of a road 11 and are directed at oncoming traffic, such as car 10. The light source 17 is a flash lighting means or unit such as described later. The camera 15 preferably is a high speed camera having an iris type shutter which, when used with a synchronized high speed flash lighting unit such as 17, is capable of "stopping" an automobile traveling at high speeds. As shown, the camera 15 is positioned ahead of the oncoming vehicle 10. Several types of cameras having the necessary specifications are available on the market. One such camera is manufactured by Robot Foto und Electronic, a corporation of Dusseldorf, Germany and is identified as Model No. 36ME. A filter 27 is provided over the camera lens to filter out most of the radiations of the visible spectrum and to pass only the deep red of the visible spectrum and the near infra-red radiation; no harm occurs if the filter also passes some or all of the rest of the infra-red spectrum of electromagnetic energy. Also provided is a polarizing filter 9 which reduces glare from the windshield caused by any ambient lighting that may be present.

The light source 17 is preferably an electronic flash unit comprising a Xenon filled container having a rear wall 19 which can function as a reflector having either a parabolic or an elliptical configuration, a filter 20 and a focusing lens 21. The filter 20 has optical characteristics similar to those of filter 27 in that filter 20 functions to filter out most of the radiation of the visible spectrum and to pass only the deep red radiation of the visible spectrum and near infra-red radiation, except that no harm occurs if the filter also passes other portions of the infra-red spectrum.

The lens 21 can be an inexpensive type lens, formed (for example) of laminated sheets of plastic. Considerable optical aberration in lens 21 can be tolerated since no image is focused therethrough. The only purpose of lens 21 is to provide some convergence for the divergent beam 25 radiated from the reflecting portions 19 of the container. As can be seen in FIG. 1, the lens 21 narrows the beam so that it has a general configuration as represented by the boundary lines 26 extends along a first line of sight 23. The axis of such beam is designated by the broken line 23 and is directed at the driver's position in automobile 10 at the point in time that the photograph is taken. The camera 15 is also aimed at the driver of the car 10 along a second line-of-sight 22 at the time the picture is taken.

The particular point in time at which the picture is taken is determined by the time of actuation of sensor 12 by the front wheels of the car 10 as they pass thereacross. A detecting means 13 functions to detect the relatively small signal supplied from the sensing means 12 when actuated by car 10. The detecting means 13 is a schematic representation of structures capable of performing the functions ascribed thereto herein. For example, the detecting means 13 can be constructed to cooperate with the sensor 12 to measure the velocity of a passing car. Velocity measurements, however, usually require a second sensor, such as sensor 28, which is positioned a known distance from sensor 12. When detecting means 13 is a speed violation determining means, it is constructed in such manner that an output signal will appear on its output lead 29 only when the passing car is violating a speed law.

The camera operating solenoid 14 is constructed to receive and respond to the output signal of detecting means 13 to activate the shutter of the camera 15 through the mechanical linkage 75, almost immediately after the front wheels of car 10 have actuated sensor 12. It is assumed that when the invention is employed as a speed detecting means, the computation of the velocity accomplished by the detecting means 13 occurs very quickly after the front wheels have passed sensor 12. Thus, actuation of camera 15 will occur after the front wheels of the car have passed only a few feet beyond sensor 12. Accordingly, both camera 15 and flash unit 17 can be aimed permanently at a fixed point since the driver of a car will be within a few feet of said fixed point when the picture is taken, regardless of the car's velocity.

For energization of the flash lighting means 17, there is provided a flash unit energizing means 16 (containing an appropriate power supply, not shown) and connected by a lead portion 76 to the camera 15. Upon opening of the shutter 82 of the camera 15, current passes (as will be described) from the energizing means 16 through a lead 78, across the flash unit electrodes 18, and back through the energizing means 16 through a lead portion 77 to produce the desired flash of radiant energy. As will be described, there are provided means for synchronizing or coordinating the operation of the flash lighting means 17 with the actuation of the shutter of the camera 15.

Figure 4:
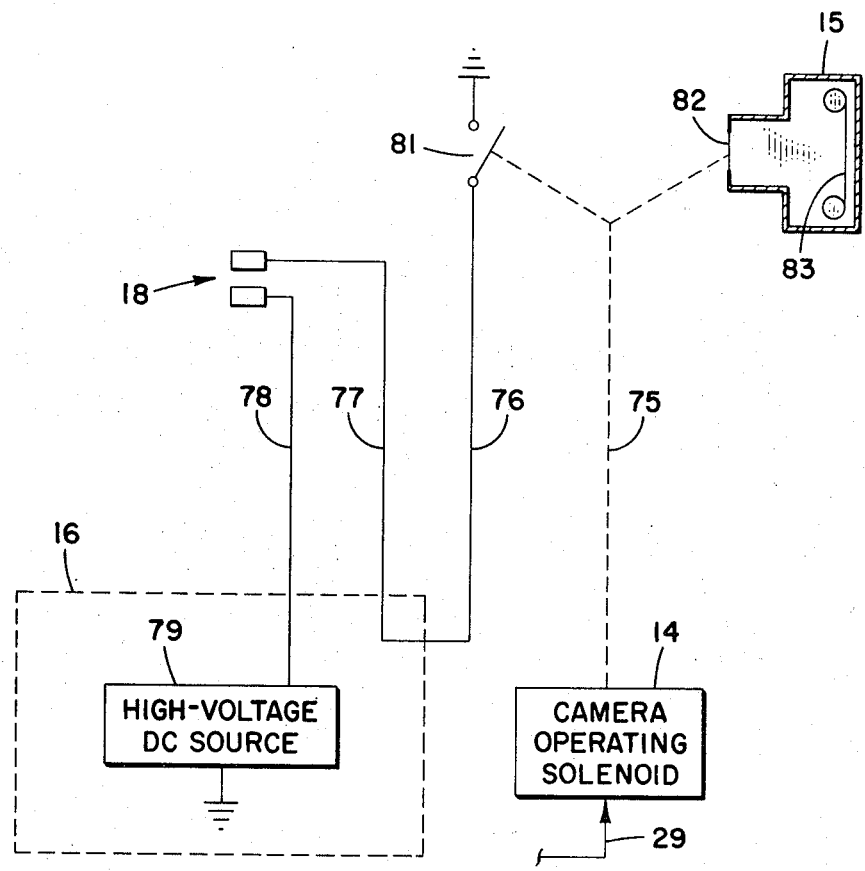
FIG. 4 is a schematic representation of an exemplary system for synchronizing or coordinating the operation of the flash lighting unit with operation of the camera.

Many camera shutters have provision for synchronizing flash lighting units with the opening of the shutter, electrical contacts being provided for closing the flashlamp circuit at a predetermined time in the shutter cycle, and the coordinating means shown herein is therefore by way of example only. With reference, then, to FIG. 4, the flash unit energizing means 16 comprises, for example, a source of high-voltage D.C. or rectified current 79 which is connected through a lead 78 to one member of the pair of flash unit electrodes 18. A lead portion 77 extends from the other of the electrodes 18 back to the energizing means 16 and thence, as a lead portion 76, to an ungrounded terminal of a camera-located switch 81, the other terminal of which switch is grounded. The movable contact element of the switch 81 is connected to the mechanical linkage 75 extending from the camera operating solenoid 14 to the shutter 82 of the camera 15 (or, if desired, to the shutter) and is moved in consequence of movement of the linkage 75, to close the switch 81 and thus occasion passage of current from the voltage source 79 and across the electrodes 18 when the linkage 75 moves to open the shutter 82, thus allowing the reflected radiations to form an image on the film 83 contained in the camera 15.

Figure 5:
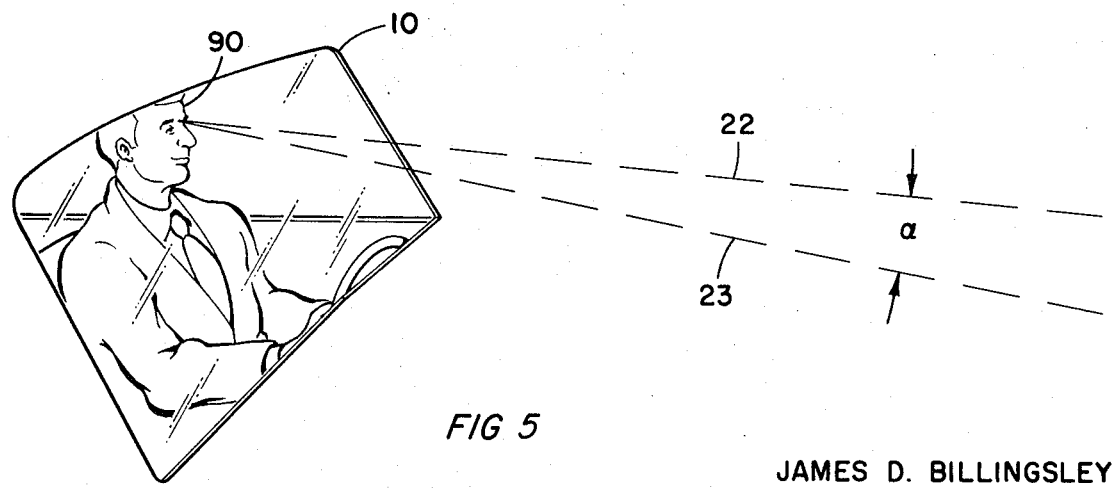
FIG. 5 is an enlarged representation of a portion of FIG. 1 for showing the driver and the two lines of sight discussed below.

It can be seen in FIGS. 1, 5 that the angular distance between the line-of-sight 22 between the camera and the driver 90, and the line-of-sight 23 between the flash unit 17 and the driver 90 is equal to $\alpha$, where $\alpha$ is not less than approximately 1.8°. The purpose of this divergence between the two lines-of-sight 22 and 23 is substantially to avoid reflection of the flash unit radiation from the retinas of the driver's eyes back to the camera 15. Such retinal reflection can impair the identification of the driver.

Figure 2:
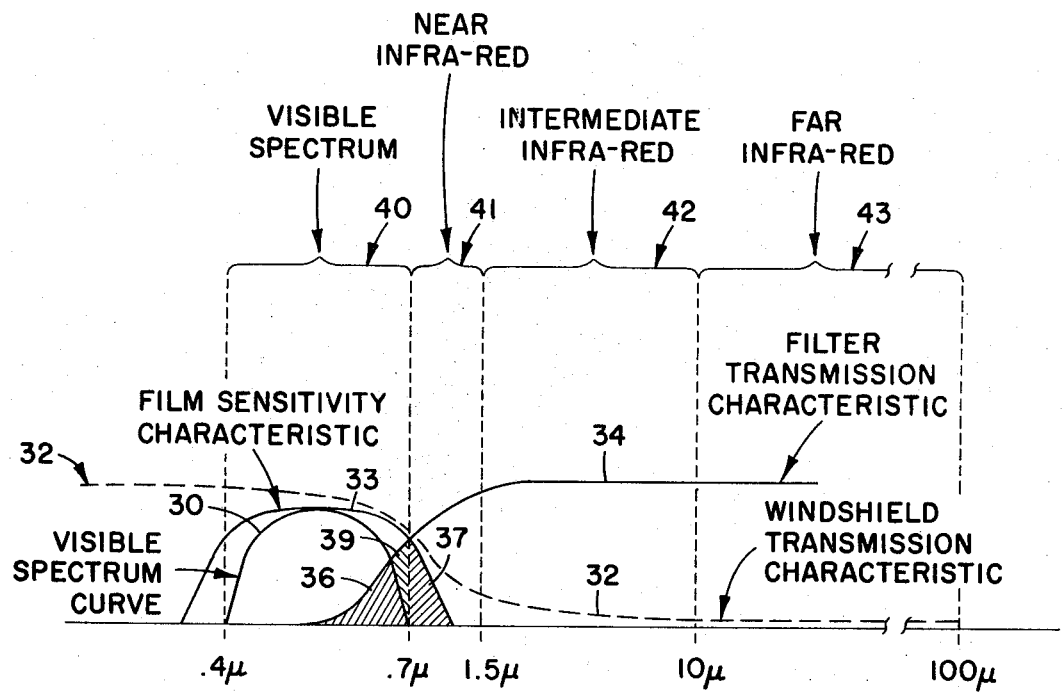
FIG. 2 is a set of curves which illustrates the optical characteristics of the filters, the windshield, and the film and which represents a portion of the radiation spectrum including the visible range, the near infra-red range, the intermediate infra-red range, and the far infra-red range.

Before discussing the curves of FIG. 2, it will be helpful to state the conditions and limitations which determine the required lighting and film characteristics. Firstly as explained later, it is desired that the driver see the flash. In order to avoid impairing the driver's vision, the visible portion of the energy emitted in the flash is caused to lie in the deep red portion of the visible range. Secondly, there must be sufficient radiant energy reflected back to the film to create an image thereon. The reflected and visible deep red light ordinarily does not contain sufficient energy for such image creating purpose. Since the windshield filters out most of the infra-red energy of frequency below that of the near infra-red range, the near infra-red energy must be utilized. The desirability of using the combination of visible deep red and the near infra-red radiation is further enhanced by the fact that this permits the utilization of a polarizing filter 9 and filter 27 having such characteristics that glare from ambient light, such as sunlight, can be filtered out with maximum effectivity.

Referring now to FIG. 2, there is shown a portion of the radiation spectrum including the visible range 40, the near infra-red range 41, the intermediate infra-red range 42, and the far infra-red range 43. The curve 30 represent the visible light to which the human eye is sensitive, and the curve 33 represents the radiation sensitivity of the film. It is to be understood that different films have different sensitivity characteristics, and that the curve 33 is only representative. In general, it is desired that the film be sensitive to the visible deep red and to the near infra-red radiations in such proportions that neither the visible deep red or the near infra-red energy received by the film comprises less than 20 percent of the total electromagnetic energy effective in producing an image on the film. One film suitable for use in the present invention is manufactured by the Eastman Kodak Company and is identified as Film No. 2485.

It is not necessary that the film be sensitive to intermediate infra-red radiations since the windshields of modern cars function as efficient filters of intermediate and far infra-red energies. Such optical characteristic of windshields is represented by the curve 32, which shows a filtering out of the intermediate and far infra-red spectra 42,43 but a passing of the higher frequency radiations including the near infra-red radiation 41 and the visible range including the deep red portion thereof.

The filters 20 and 27 of FIG. 1 are selected to have an optical transmission characteristic as represented generally by the curve 34 (FIG. 2), which shows that most of the visible spectrum 40 is filtered out, but that the visible deep red portions 36, 39, the near infra-red range 37, and the rest of the infra-red range are passed therethrough. As discussed above, however, most of the intermediate infra-red is filtered out by the automobile windshield.

Thus, the radiation which is received at, and which will record an image on the sensitized film, is contained within the shaded areas 36, 37 and 39 of FIG. 2. More specifically, the boundaries of such image recording (usable) radiation are defined by the overlapping portions of the curves 34 and 33. Since the portions 36 and 39 of this image recording spectrum are in the deep red range of the visible spectrum, they can be seen by the driver when the flash occurs, thus informing him that he has committed a speeding violation. However, since these portions 36 and 39 are deep red, they will not cause momentary blindness or otherwise impair the driver's vision, either in the daytime or at night. The portion 37 of the usable spectrum is in the near infra-red and is not visible to the driver. Only the sensitized film can "see" this portion of the received spectrum.

It is to be specifically noted that ambient daylight, etc. reflected from the automobile windshield will produce no glare as far as the sensitized film is concerned, since most of the ambient light reflected from the windshield is filtered through both the visible spectrum filter 27 (FIG. 1) and the polarizing filter 9 and consequently does not reach the sensitized film in the camera. At night, there is very little ambient light except that originating from artificial lighting such as the headlights of cars, street lights, and the like. Here again, the filters 27 and 9 function to filter out substantially all of the visible portion of such ambient, artificial lighting so that little or no glare reaches the sensitized film.

Figure 3:
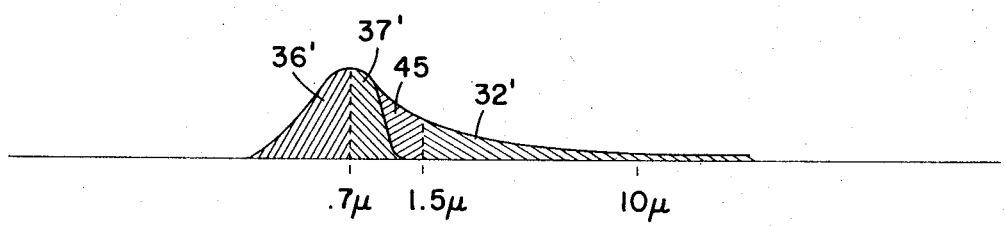
FIG. 3 shows another set of waveforms illustrating the actual and the utilizable radiation received by the camera film and after passing through the various filters of the system, including the automobile windshield.

In FIG. 3, the shaded portions 36′, 37′, 45 and 32′ represent the total radiation received by the film. Some of these radiations are effective to form an image on the film and others are not, the image forming effectiveness of such radiations being determined by the sensitivity characteristic of the film. More specifically, the deep red radiant energy represented by shaded area 36′ and the near infra-red radiant energy represented by shaded area 37′ are cooperatively effective to create an image of the driver and his car on the film. The near infra-red radiant energy of shaded area 45 and the remaining infra-red energy of shaded area 32′ are not effective to form an image on the film since they lie outside the sensitivity range of the film.

It can be seen that the amount of near infra-red radiation in shaded area 37′, which is received and utilized by the film, is somewhat less than the received and utilized radiant energy represented by shaded area 36'. Thus, it will be apparent that with a film having the sensitivity characteristic represented by curve 33 of FIG. 2, the driver's image is recorded primarily by the deep red radiation. Films which are more sensitive to the near infra-red than to the visible deep red also can be employed with good results.

It is to be understood that the form of the invention shown and described herein is but a preferred embodiment thereof and that various changes may be made therein, such as, for example, in the filtering arrangement, in the positioning of the camera and the light source with respect to the oncoming traffic, or in the choice of films with different sensitivity characteristics without departing from the spirit or scope of the invention. It is also apparent that the photographing means shown and described herein can be employed in applications other than single lane traffic monitoring. For example, it can also be utilized in multi-lane traffic monitoring, and generally in any situation requiring the photographing of an object located behind a transparent medium such as glass, having infra-red filtering characteristics.

What is claimed is:

1. In a traffic monitoring system for obtaining an identifiable photograph of the facial features of a driver of a vehicle having a windshield, the combination comprising:
    detecting means responsive to the presence of a passing vehicle to produce a signal indicating the presence of such vehicle;
    a camera comprising a shutter and loaded with a film which is sensitive to the visible deep red and the near infra-red portions of the electromagnetic spectrum;
    actuating means connected to receive said signal and responsive thereto for operating the shutter;
    flash illuminating means for producing a beam of radiant energies consisting substantially of radiations of frequencies no higher than that of the visible deep red frequencies and for directing the beam along a first line of sight wherein some of said radiant energies pass through the windshield onto the driver's face and are reflected therefrom to the camera, the flash illuminating means being positioned where it is ahead of the vehicle when said signal occurs and being energizable for producing said beam of radiant energies, and the camera being positioned to receive radiant energies of said beam reflected from the driver's face at the time of said operation of the shutter;
    energizing means responsive to actuation of the camera shutter for energizing the flash illuminating means; and
    filtering means for blocking from entry into the camera substantially all radiations of frequencies higher than that of visible deep red light.

2. A combination in accordance with claim 1 in which said camera is positioned near said flash illuminating means but along a second line-of-sight having an angle of divergence from said first line-of-sight for minimizing the amount of reflection of radiation from said flash illuminating means from the retinas of said driver and along the second line of sight.

3. A combination in accordance with claim 1 in which said camera is positioned near said flash illuminating means but along a second line of sight in relation to the facial features of the driver at the time of occurrence of said indicating signal, said second line of sight being at an angle to said first line of sight that is no smaller than approximately 1.8°, whereby there is minimized the amount of reflection of radiation from said flash illuminating means from the retinas of said driver and to the camera.

4. An image recording system for obtaining an identifiable photograph of an object positioned behind a sheet of transparent material having the characteristic of filtering out major portions of the infra-red spectrum having frequencies lower than that of near infra-red, said system comprising:
    illuminating means positioned in front of said sheet of transparent material and operative for illuminating said object through said sheet of transparent material with radiant energy including the visible deep red and near infra-red portions of the electromagnetic spectrum and for obtaining reflection, from said object, of some of said radiant energy back through the sheet of transparent material;
    filtering means for filtering out substantially all of the visible light of frequency above the visible deep red from energies reflected from said object and for passing the visible deep red, the near infra-red, and the adjacent, lower-frequency radiations of the electromagnetic spectrum;
    a camera positioned to receive said reflected, filtered radiant energy and loaded with a film which is sensitive to the visible deep red and the near infra-red portions of the electromagnetic spectrum, the camera having a shutter;
    means for actuating said shutter; and
    means for coordinating the operation of said illuminating means with the actuation of said shutter.

5. In a traffic monitoring system, means for obtaining an identifiable photograph of the facial features of a driver of a vehicle having a windshield, said means comprising:
    a camera placed ahead of the vehicle and positioned to receive radiant energy reflected from the face of the driver of said vehicle, the camera having a shutter actuable for opening and closing and the camera being loaded with a film that is sensitive to visible deep red and near infra-red radiant energies;
    flash illuminating means for supplying, to the camera, radiant energy at least some of which passes, along a first line of sight, through the windshield of the vehicle to the face of the driver and is reflected therefrom to the camera while the camera is ahead of the vehicle;
    filtering means for filtering out of the radiant energy passing from the flash illuminating means to the camera via the driver's face substantially all light of frequency above that of visible deep red light, the filtering means being operative for passing therethrough radiations including visible deep red and near infra-red radiations; and
    means for coordinating the operation of the flash illuminating means with opening of the shutter of the camera.

6. A means for obtaining an identifiable photograph in accordance with claim 5 in which said camera is positioned along a second line of sight extending to said driver's face and displaced from said first line of sight by an angle no smaller than approximately 1.8°, whereby there are minimized the reflections of the radiation from said flash illuminating means from the retinas of the driver's eyes and to said camera.

7. A means for obtaining an identifiable photograph in accordance with claim 5 in which said filtering means comprises at least one filter located between the flash illuminating means and the face of the driver.

8. A means for obtaining an identifiable photograph in accordance with claim 5 in which said filtering means comprises at least one filter located between the camera and the face of the driver.

9. A means for obtaining an identifiable photograph in accordance with claim 5 in which said filtering means comprises at least one filter positioned between the flash illuminating means and the driver's face and at least one filter positioned between the camera and the driver's face.

10. A method for obtaining, of a radiation-reflective object and through a sheet of transparent material having the characteristic of filtering out major portions of the infra-red spectrum having frequencies lower than that of near infra-red, a photograph which is clear and free of the deleterious effects of glare, said method comprising the steps of:

flooding said object, through said sheet of transparent material, with radiation including the visible deep red and near infra-red portions of the electromagnetic spectrum to obtain reflection of some of the radiations from the object and back through the sheet of transparent material;

filtering the radiation reflected back through the sheet of transparent material from said object and radiations reflected directly from said sheet of transparent material through a filter which passes only the visible deep red, the near infra-red, and lower-frequency portions of said infra-red spectrum; and recording the image of said object modulated on said filtered radiation on film which is sensitive to visible deep red and near infra-red radiations.

11. A method for obtaining, of a vehicle and the driver thereof, a photograph which is clear and free of the deleterious effects of glare, the portion of which photograph that depicts the driver being taken through a windshield of the driver's vehicle, which windshield has the characteristic of filtering out a major portion of the infra-red spectrum having frequencies lower than that of near infra-red, said method comprising the steps of:

detecting the presence of an oncoming vehicle;

supplying to a camera radiations including the visible deep red and near infra-red frequencies and which originate from a light source and are reflected, from the driver and from the front of the detected vehicle, to the camera, the radiations reflected from the driver to the camera passing through the windshield and the step of supplying the above-said radiations to the camera including filtering the radiation reflected from the driver through a filter which passes only the visible deep red and lower-frequency radiations; and recording, in the image-recoding means, the image of said driver modulated on said reflected and filtered radiations.

12. A method of obtaining, through the windshield of a vehicle, a photograph of a driver of the vehicle which is clear and free of the deleterious effects of glare, said method comprising the steps of:

detecting the presence of an oncoming, driven vehicle;

reflecting visible deep red and near infra-red radiations from the detected vehicle and the driver thereof, along a second line of sight wherein such radiations reflected from the driver pass outwardly from the vehicle through the windshield, by directing on the front of the vehicle, including the windshield thereof, a beam of radiant energies containing visible deep red and near infra-red radiations and passing along a first line of sight extending at an angle to the second line of sight of no less than approximately 1.8°, whereby reflections from the driver's retinas along the second line of sight are minimized;

filtering, from radiation passing from the driver and vehicle along the second line of sight, visible light of frequency ranges higher than that of the visible deep red; and photographically recording the image of the vehicle and driver modulated on the reflected and filtered radiations passing along the second line of sight.

13. A method for obtaining, of a driver of a vehicle, a photograph which is clear and free of the deleterious effects of glare, which photograph of the driver is taken through a windshield of the vehicle, which windshield has the characteristic of filtering out a major portion of the infra-red spectrum having frequencies lower than that of near infra-red, said method comprising the steps of:

detecting the presence of an oncoming, driven vehicle;

supplying to an image-recording means radiations including the visible deep red and near infra-red frequencies and which originate from a light source and are reflected from the driver to said means, the radiations reflected from the driver to said means passing through the windshield and the step of supplying the above-said radiations to the image-recording means including filtering the radiation reflected from the driver through a filter which passes only the visible deep red and lower-frequency radiations; and recording, in the image-recording means, the image of said driver modulated on said reflected and filtered radiations.

14. A method for obtaining a photograph of a person, for monitoring traffic and without significantly impairing the vision of such person, through a windshield having the characteristic of filtering out major portions of the infra-red spectrum having frequencies lower than that of near infra-red, said method comprising the steps of:

flooding the face of such person, through said windshield, with radiations restricted to frequencies including and no higher than that of the visible deep red portion of the electromagnetic spectrum to obtain reflection of some of the radiations from the face of such person and back through the windshield; and recording the image of said face of such person modulated on said reflected radiations on film which is sensitive to visible deep red and lower-frequency radiations.

15. A method of obtaining, of a vehicle having a windshield and, through the windshield, of a driver of the vehicle, a photograph which is clear and free of the deleterious effects of glare, said method comprising the steps of:

detecting the presence of an oncoming, driven vehicle;

reflecting visible deep red and near infra-red radiations from the detected vehicle and the driver thereof, along a second line of sight wherein such radiations reflected from the driver pass outwardly from the vehicle through the windshield, by directing on the front of the vehicle, including the windshield thereof, a beam of radiant energies containing visible deep red and near infra-red radiations and passing along a first line of sight having an angle of divergence from the second line of sight for minimizing reflections from the driver's retinas along the second line of sight;

filtering, from radiation passing from the driver and vehicle along the second line of sight, visible light of frequency ranges higher than that of the visible deep red; and photographically recording the image of the vehicle and driver modulated on the reflected and filtered radiations passing along the second line of sight.

* * * * *